US008184149B2

(12) United States Patent
Mensink et al.

(10) Patent No.: US 8,184,149 B2
(45) Date of Patent: May 22, 2012

(54) OPHTHALMIC APPARATUS AND METHOD FOR INCREASING THE RESOLUTION OF ALIASED OPHTHALMIC IMAGES

(75) Inventors: Michiel Herman Mensink, S-Gravenhage (NL); Koenraad Arndt Vermeer, Voorburg (NL)

(73) Assignee: I-Optics B.V., Rijswijk (NL)

( * ) Notice: Subject to any disclaimer, the term of this patent is extended or adjusted under 35 U.S.C. 154(b) by 344 days.

(21) Appl. No.: 12/666,120

(22) PCT Filed: Jun. 27, 2008

(86) PCT No.: PCT/NL2008/000164
§ 371 (c)(1),
(2), (4) Date: Dec. 22, 2009

(87) PCT Pub. No.: WO2009/002157
PCT Pub. Date: Dec. 31, 2008

(65) Prior Publication Data
US 2011/0037845 A1    Feb. 17, 2011

Related U.S. Application Data

(60) Provisional application No. 60/946,401, filed on Jun. 27, 2007.

(51) Int. Cl.
*H04N 7/18* (2006.01)
*G06K 9/00* (2006.01)

(52) U.S. Cl. ............. 348/78; 348/73; 351/246; 382/128
(58) Field of Classification Search ............... 348/78, 348/73; 351/246, 206; 382/128
See application file for complete search history.

(56) References Cited

U.S. PATENT DOCUMENTS

| | | | | |
|---|---|---|---|---|
| 6,454,410 | B1 * | 9/2002 | Berger et al. | 351/206 |
| 2006/0077349 | A1 * | 4/2006 | Kushida | 351/246 |
| 2006/0132709 | A1 | 6/2006 | Olivier et al. | |

OTHER PUBLICATIONS

Min Kyu Park et al: "Super-resolution image reconstruction: a technical overview", IEEE Signal Processing Magazine, IEEE Service Center, Piscataway, NJ, US, vol. 20, No. 3, May 1, 2003.

* cited by examiner

*Primary Examiner* — Khanh Dinh
(74) *Attorney, Agent, or Firm* — Hoffmann & Baron, LLP

(57) ABSTRACT

A method for producing an image with an increased resolution from a plurality of aliased ophthalmic images having an original resolution is described. The method comprises the steps of—providing an imaging system capable of acquiring said aliased ophthalmic images,—acquiring said aliased ophthalmic images by the imaging system, thereby generating non-integer pixel displacements between said images by using voluntary or involuntary eye movements,—determining the displacements between said images, and—producing an image with an increased resolution in an overlapping area of said aliased ophthalmic images compared to the original resolution of said images, based on said images and said displacements, using a super-resolution algorithm.

29 Claims, 2 Drawing Sheets

OPHTHALMIC APPARATUS AND METHOD FOR INCREASING THE RESOLUTION OF ALIASED OPHTHALMIC IMAGES

CROSS-REFERENCE TO RELATED APPLICATIONS

This application is the National Stage of International Application No. PCT/NL2008/000164, filed Jun. 27, 2008, which claims the benefit of U.S. Provisional Application No. 60/946,401, filed Jun. 27, 2007, the contents of which is incorporated by reference herein.

FIELD OF THE INVENTION

This invention relates to the acquisition and subsequent processing of ophthalmic images, specifically to the process of increasing the quality of in vivo ophthalmic imaging by the application of super-resolution processing. In this process, a series of low-quality images is transformed into one or more high-quality images.

BACKGROUND OF THE INVENTION

Ophthalmic images are often limited in quality. One key reason is the low level of light that may be safely used for the illumination of the imaged structures of the eye. This results in relatively few photons on the photosensitive detector internal to the imaging device. This limitation is particularly adverse in scanning imaging technologies like Optical Coherence Tomography (OCT) and Scanning Laser Opthalmoscopy (SLO). In this way the signal-to-noise ratio of the produced images is directly limited. In addition, the effective resolution, corresponding to the minimum resolution required to uniquely represent all valid data of the resulting images, is restricted.

When the number of image points (pixels) increases, the number of photons per image point must decrease, adversely affecting the signal-to-noise ratio. The effective resolution is also limited by the exposure time. In static low light scenes, the exposure time may be increased to obtain better signal-to-noise levels. Due to small involuntary eye movements, such a larger exposure time would result in increased blur in ophthalmic images, adversely affecting the quality of the produced images. Therefore the combination of short exposure time and a restricted level of illumination limits the number of pixels. Finally, costs often increase sharply when trying to obtain higher resolution images: in case of a fundus camera more expensive image sensors containing more pixels at higher sensitivity must be used. In case of OCT or SLO a faster, more sensitive and thus more expensive detector must be employed. Further, the scan rate must be increased by using a faster scanner, however, since OCT and SLO systems usually employ scanners that already operate close to their mechanical limits, increasing their speed may be very expensive or impossible.

The reduction of noise in single images has previously been achieved by various filtering techniques. These approaches work by statistical analysis of surrounding pixels. As these methods work on single images, they do not consider neighboring pixels in image series.

Previous work reduced noise in image series by averaging multiple registered images. One straight-forward implementation is to calculate a pixel-wise mean value. Other, more robust statistics have also been applied, such as the median filter, which may be applied both spatially and temporally.

To increase the resolution of single images, interpolation is commonly used. In linear interpolation, a new pixel is added in between two existing pixels by calculating the average value of the two real pixels. Other interpolation methods (e.g., cubic, spline) apply more advanced calculations that may involve an increasing number of neighboring pixels. Interpolation may be used to correct for distortions or anisotropy in the images, or to obtain larger images without stair-case effects (resulting in jagged lines). However, they cannot introduce valid information in higher spatial frequency bands and will therefore result in blurred images and may introduce artifacts. Therefore, while the number of pixels in the image is increased, the effective resolution is unaltered.

Previous work to increase the effective resolution employed mosaicking, which combines multiple smaller images into one high resolution image. This requires the acquisition of a large number of different images, each showing a detail of the full imaged area. These images are then stitched together to produce the high resolution image. Therefore, the inter-image movement needs to be large (in the order of the size of the images themselves), while the intra-image movement should be small (to prevent blurring). This process is thus time consuming and the controlling the movement at such a high precision may be very difficult.

Super-resolution is the name of a family of methods to combine several largely overlapping low-quality images into one or more high-quality images. These high-quality images show less noise, may be corrected for geometric distortions and have a higher effective resolution. One prerequisite for super-resolution is a known displacement between the low-quality images in the series. In addition, the low-quality or low-resolution images should be aliased, which means that, due to a sampling frequency smaller than the Nyquist frequency, high frequency bands are wrapped to low frequencies.

An example of actual application of super-resolution is in infra-red imaging in military settings, where a low resolution detector is placed on a vibrating stage and the resulting low resolution image series are post-processed with super-resolution algorithms in order to generate a higher resolution image.

Prior art uses of super-resolution algorithms require that the camera be moved with some known amount, for example by a motorized stage. In ophthalmic imaging, this would require fixation of the eye, which is very unpleasant for the patient.

SUMMARY OF THE INVENTION

The present invention provides in an improved method of acquiring a higher resolution image which does not require a fixation of the eye. Rather, the method according to the invention uses eye movements in order to obtain the required displacements. Further, this method provides in handling the unknown displacements between the ophthalmic images so that super-resolution methods may be applied and high-quality images can be constructed.

One object of the present invention is to provide a method for producing an image with an increased resolution, from a plurality of aliased ophthalmic images. As a result, additional anatomical features can be revealed on the image with the increased resolution.

According to an aspect of the present invention, there is provided a method for producing an image with an increased resolution from a plurality of aliased ophthalmic images having an original resolution, the increased resolution being higher than the original resolution, the method comprising:

providing a imaging system capable of acquiring said plurality of aliased ophthalmic images, acquiring said plurality of aliased ophthalmic images by the imaging system, thereby generating non-integer pixel displacements between said plurality of aliased ophthalmic images by using voluntary or involuntary eye movements, determining displacements between said plurality of aliased ophthalmic images, and producing the image with an increased resolution in an overlapping area of said plurality of aliased ophthalmic images, based on said plurality of aliased ophthalmic images and said determined displacements, using a super-resolution algorithm.

To achieve the mentioned object, the method according to an aspect of the invention includes steps to first obtain a plurality of images of approximately the same part of the eye. This can e.g. be realized by an imaging system such as a fundus camera, OCT or SLO system or the like. During the acquisition of these images, the subject's eye may be induced to look at a moving visual stimulus, thereby creating aliased images due to voluntary eye movements. The visual stimulus may e.g. be moved in synchronism with the frame rate of the image capturing. As an example, the visual stimulus can e.g. be a moving light spot moving in horizontal or vertical direction. When the eye is acquainted with the movement and thus follows the movement of the light spot, a number of images can be captured. By doing so, aliased images can be obtained that may have a substantially horizontal displacement between them or a substantially vertical displacement. By doing so, one can ensure that images are available that are aliased in both vertical and horizontal direction. As such, the resolution enhancement can be realized in both said directions. It is understood that a random movement of a visual stimulus may equally be applied.

Alternatively, small natural involuntary eye movements may be used to generate the aliased images. As the aliased images are obtained due to the movement of the subjects eye (either voluntary or involuntary), the imaging system as applied in the method according to the present invention can remain in a substantially fixed position during the image acquisition. This enables the application of a simplified imaging system compared to a system requiring e.g. a motorized stage to obtain the aliased images. As, in accordance with the present invention, no fixation of the eye is required (the subject may even be stimulated to move its eye), the method according to the present invention can be more comfortable compared to methods that require a fixation of the eye.

In a next step, the method then determines the displacements between the ophthalmic images. What is meant with the displacements between the images are the differences in position of the object (e.g. part of an eye) captured on the images. In accordance with the present method, these different positions of the object on the images are caused by the eye movements (either voluntary or involuntary) occurring during the acquisition of the images. The determination of the displacements between the ophthalmic images can e.g. be realized using a registration algorithm. As an alternative, the displacements can be determined by an external device such as an eye tracker.

Next, an image is produced using a super-resolution algorithm, the image having an increased resolution in an overlapping area of said aliased ophthalmic images compared to the original resolution of said images, the increased resolution being higher than the original resolution. As such, the method combines the low-quality images (having a comparatively low original resolution) and the displacements into one or more high-quality super-resolution images (having a comparatively high resolution). Further improvements can be applied to the super-resolution image (or images) such as correcting for geometric distortions, reducing the amount of noise and enhancing the effective resolution.

According to an other aspect of the present invention, there is provided an ophthalmic apparatus for producing an image with an increased resolution from a plurality of aliased ophthalmic images having an original resolution, the increased resolution being higher than the original resolution, the apparatus comprising:

an imaging system for acquiring said plurality of aliased ophthalmic images, thereby generating non-integer pixel displacements between said plurality of aliased ophthalmic images by using voluntary or involuntary eye movements, a processing unit for determining the displacements between said plurality of aliased ophthalmic images, and producing an image with an increased resolution in an overlapping area of said plurality of aliased ophthalmic images, based on said plurality of aliased images and said displacements, using a super-resolution algorithm.

The apparatus according to the invention enables the production of an image with an increased resolution in an overlapping area of a plurality of aliased ophthalmic images compared to the original resolution of said images. The apparatus according to the invention comprises an imaging system arranged to acquire the plurality of aliased ophthalmic images by using voluntary or involuntary eye movements. The imaging system as applied in the apparatus according to the invention may e.g. comprise a fundus camera type or a scanning type imaging system for capturing the aliased images. In an embodiment of the apparatus, the imaging system is provided with a visual stimulus for, in use, inducing voluntary eye movements. As an example, during the acquisition of the ophthalmic images, the subject may be asked to look at a moving visual stimulus provided by the imaging system. As a result, a series of aliased ophthalmic images can be obtained.

The apparatus according to the invention further comprises a processing unit for determining the displacements between the images (i.e. the differences in position of the object (e.g. part of an eye) captured on the images). Such a processing unit can e.g. comprise a computer or computational unit for determining the displacements e.g. by using a registration algorithm. In order to determine the displacements, the processing unit of the ophthalmic apparatus according to the invention may also comprise a device for monitoring the displacements of the object (e.g. the eye), such as an eye-tracker.

Compared to apparatuses as known in the art, the imaging system of the ophthalmic apparatus according to the present invention enables the acquisition of aliased ophthalmic images without the requirement of a moving imaging system since the capturing of the aliased images with an apparatus according to the present invention is based on the use of voluntary or involuntary eye movements. As such, the imaging system of the ophthalmic apparatus according to the invention can remain substantially stationary during the acquisition of the aliased ophthalmic images. As such, by using voluntary or involuntary eye movements, the apparatus according to the present invention is capable of meeting the requirements for the application of super resolution algorithms and thus the generation of an image with improved resolution (higher than the resolution of the aliased ophthalmic images) from a plurality of aliased ophthalmic images.

As a result, an imaging system as applied in either the method according to the present invention or in an ophthalmic apparatus according to the present invention may provide images of a lower resolution than required for further analysis (since the resolution can be increased by the application of a super resolution algorithm); thereby reducing costs of the imaging system.

In an embodiment of the present invention, the processing unit of the ophthalmic apparatus can be arranged to determine the displacements between the aliased ophthalmic images due to optical, geometrical or other distortions, and correcting for these distortions.

In an embodiment of the present invention, the processing unit of the ophthalmic apparatus can be arranged to:
- divide each of the aliased ophthalmic images into a number N smaller images,
- group said smaller images together into N series of smaller images,
- determine displacements between the smaller images for each of the N series of smaller images, and produce an image with a an increased resolution, one image for each of the N series of smaller images.

An embodiment of the method according to the present invention may further be applied to reduce noise in ophthalmic images, which is often substantial in diagnostic applications due to the limited amount of light used to obtain these images. Further, an embodiment of the method according to the present invention can be applied to reduce artifacts and distortions in ophthalmic images caused be eye movements. An embodiment of the method according to the present invention further allows for the correction of additional geometric distortions and optical aberrations, such as those resulting from the imaging optics and the optics of the subject's eye. These methods may equally be implemented in e.g. the processing unit of the ophthalmic apparatus according to the present invention.

In an embodiment, the present invention allows high frame rates that result in small within-image movements but also in noisy acquired images. These noisy images may then be combined to clean, high quality images by the present invention, still showing small within-image movements.

DETAILED DESCRIPTION OF PREFERRED EMBODIMENTS

Figure 1:
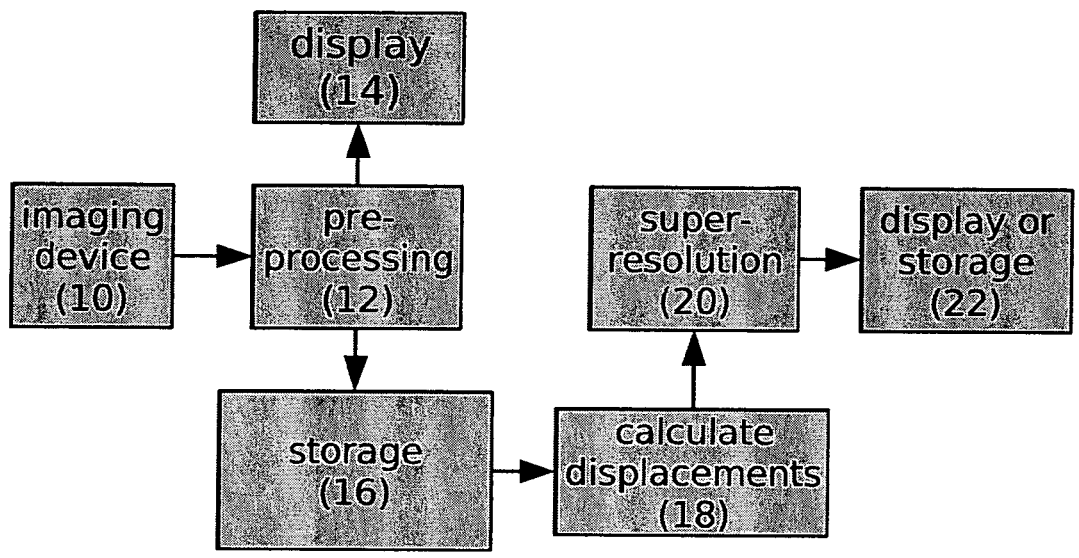
FIG. 1 schematically shows a flow chart of an embodiment of the method according to the present invention.
Figure 2:
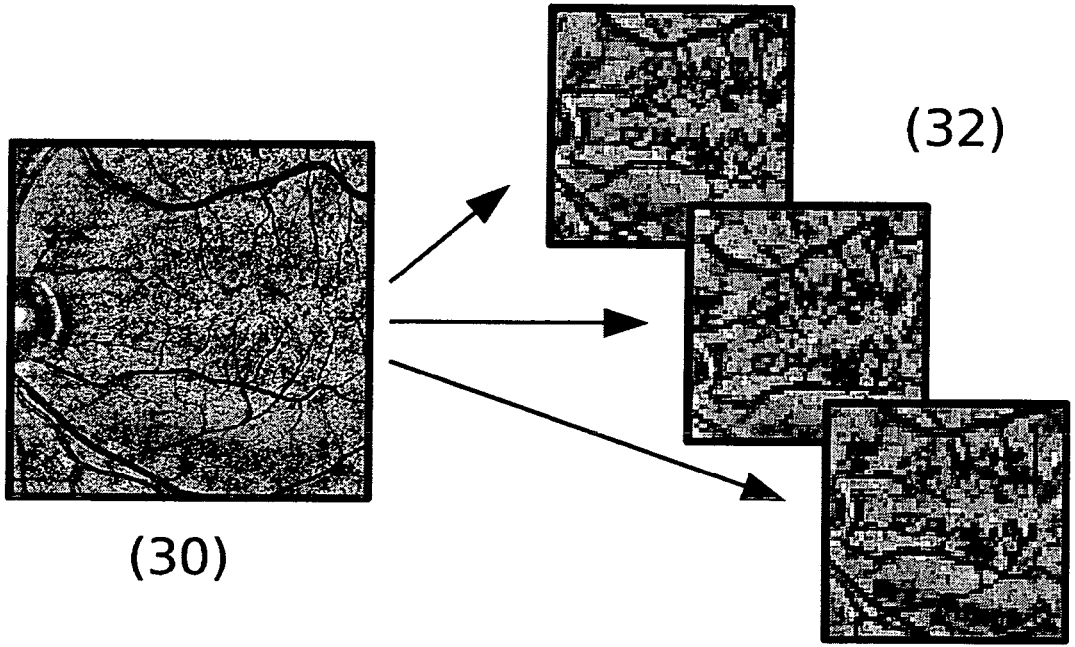
FIG. 2 illustrates the process of acquiring several low-resolution displaced images of the human retina.
Figure 3:
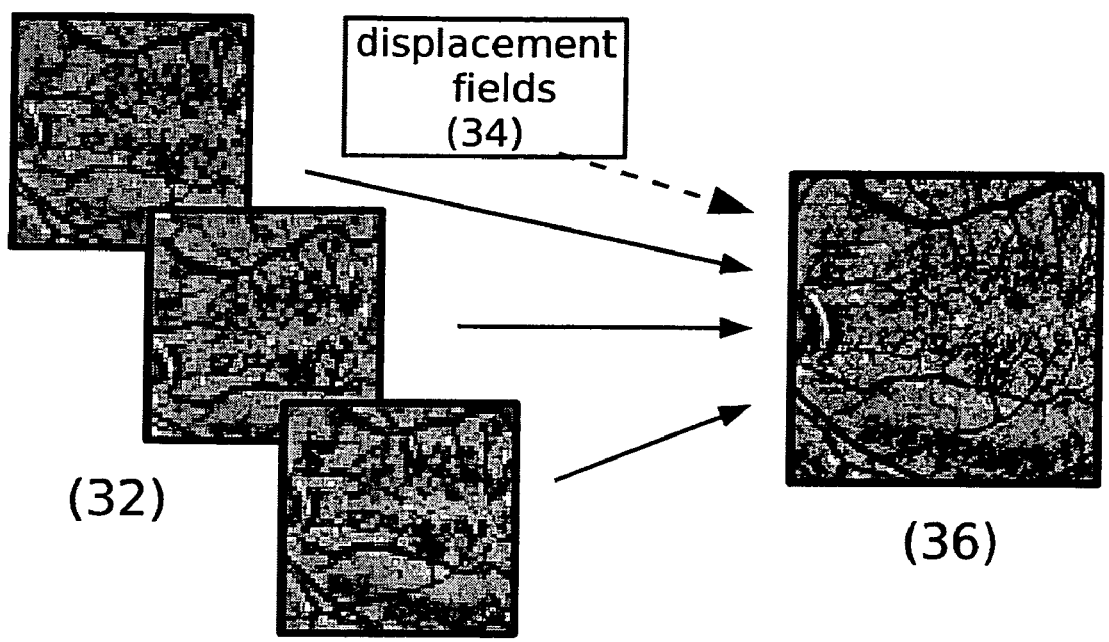
FIG. 3 illustrates combining the low-resolution images and the calculated displacement fields into a high-resolution image.

Many variations and modifications to the following description are feasible within the scope of the present invention. The specifics hereafter are included for purposes of illustration and the described embodiment of the invention is set forth without loss of generality to the claimed invention. More specifically, the described methods for imaging, pre-processing, storage, registration, super-resolution and display purposes are to be regarded as examples only and may be replaced with other methods, combined or omitted.

In an embodiment of the invention, a moving visual stimulus may cause small eye movements which enable the capturing of aliased images required to enable the application of a super-resolution algorithm on a series of such low-quality ophthalmic images. In an alternative embodiment of the invention, small involuntary random eye movements are used for generating the images.

If the resolution of the imaging optics is better than the resolution of the imaging system (defined by the pixel size of an imaging sensor of the imaging system) and frequencies higher than the Nyquist frequency are present in the image, aliasing may occur. This is frequently the case in affordable ophthalmic imaging systems. In aliased images, energy from high spatial frequencies is mapped to lower frequencies. In single images, high and lower frequencies can therefore not be retrieved separately. However, if multiple images with non-integer pixel displacements are available, these high frequencies may be recovered if the displacements are known. In accordance with the present invention, the non-integer pixel displacements are induced by eye movements, either voluntary or involuntary.

The individual images can be acquired with an ophthalmic imaging device (10), for example a fundus camera, OCT or SLO system. In order to realize an image having an improved resolution using a super-resolution algorithm, the images used should overlap in the area of interest. Preferably, the images should have as much overlap as possible as this enables the generation of an improved resolution image over a larger part of the images. Also, if more images are available for a certain part of the object observed, a higher resolution enhancement can be realized for that part. Parts of the actual scene (30) are repeatedly imaged with limited resolution (32). The amount of available information for each imaged location, represented by the number of images in which that location is observed, determines the maximum feasible increase in resolution. The required number of images depends on the nature of the subject's eye movements, but a common rule of thumb is that the number of images should preferably exceed the factor by which the number of pixels is increased. Some pre-processing (12), such as automatic adjustment of brightness, contrast or known distortions, may be performed immediately after acquisition of the images, or at a later stage.

Since multiple images are required for the reconstruction of a high-quality (i.e. improved resolution) image, they can be temporarily stored in volatile or non-volatile memory (16). The individual low-quality images may be displayed in a conventional way (14), e.g., on a computer screen, during acquisition of the image series to be able to monitor the imaging process.

The low-quality images can be registered to some common reference grid (18). For example, an image may be registered to the previous one, resulting in a continuous stream of displacements over time. In addition, several aberrations and distortions may be corrected by carefully defining the reference grid.

In case a scanning imager is used, like OCT or SLO, eye movements often cause distortions in the images, and therefore may prevent accurate registration. This can be countered by dividing each image in smaller images, for instance by dividing each image into e.g., 20 'strips', and then registering the strips within each 'stack' or series. If a distortion in a given strip prevents accurate registration with other strips, the strip can be discarded.

A large number of registration methods are available (see, for example, Thévenaz et al, IEEE Trans. Image Proc., 7(1): 27-41, 1998). These methods can e.g. be based either on the raw gray level data or on detected landmarks. Such a landmark can be used to determine the displacements between the images. As an example of such a landmark, particular points that can be noticed on a plurality of images such as blood vessels could be applied although, in principle, each point having a certain contrast with its surrounding could be applied as a landmark. By minimizing a distance function calculated from e.g. the difference between the gray level data or the landmarks, the displacements between the images can be determined. For ophthalmic images with relatively small movements, rigid transformations generally suffice, although more complicated models may be required to account for optical distortions. Alternatively, the displacement may be determined by some external device, such as an eye tracker. Such an eye tracker can e.g. monitor a central point on the pupil of the eye and/or reflections of the cornea originating from a light source, e.g. an IR light source. Using such an eye tracker, the position of eye can be monitored (or tracked) continuously both with respect to translation and rotation.

Based on the computed displacement fields (34) of all images in the image series to a common reference grid and the images themselves (32), any super resolution method (20) (see, for example, Irani and Peleg, CVGIP: Graphical Models and Image Processing, 53(3):231-239, 1991) may be used to compute the high quality images (36). Briefly, these methods first define a model of the full imaging process. They then to estimate the high resolution image that minimizes the difference between the modeled low resolution images and the acquired images. These super resolution algorithms may incorporate further knowledge on the imaging system (e.g., in the form of point spread functions or optical transfer functions) or on the images object (e.g., in the form of filters or regularization) to reach a higher image quality than would be feasible based on the image data alone. If the displacements fields contain optical, geometrical and other distortions, they are corrected for as well.

Finally, the high quality image can be displayed and/or stored for later retrieval and/or analysis (22).

As an example on how the present invention can be applied, one hundred images (290×512 pixels) of a healthy retina were acquired by a scanning laser opthalmoscope (SLO) at a wavelength of 785 nm. The acquisition time was about 57 ms per image and the images were acquired at a rate of 10 Hz. The images were anisotropic with a factor of about 2.1. They were normalized for local contrast and registered with a sub-pixel accuracy based on a detected blood vessel pattern (rotation and translation only). Two images, acquired during blinking, were automatically discarded due to a large registration residue. About 25% of the other images showed artefacts, such as corneal reflections. For image averaging, the value of each pixel was obtained by calculating the median of corresponding pixels in all images. The median is found to be a robust estimator for the mean, thereby reducing the effect of outliers.

Super resolution was performed on the registered low resolution images in a two-step way. First, the low resolution images were mapped to a high resolution grid to obtain an initial estimate of an high resolution image. Then, the high resolution image was iteratively updated to minimize the total error of the simulated low resolution images compared to the actual acquired low resolution images. The high resolution images were corrected for the anisotropy and provided a 40% zoom, resulting in an image of 841×707 pixels (4 times as many as in the original images).

The invention claimed is:

1. A method for producing an image with an increased resolution from a plurality of aliased ophthalmic images having an original resolution, the increased resolution being higher than the original resolution, the method comprising:
   providing a imaging system capable of acquiring said plurality of aliased ophthalmic images,
   acquiring said plurality of aliased ophthalmic images by the imaging system, thereby generating non-integer pixel displacements between said plurality of aliased ophthalmic images by using voluntary or involuntary eye movements,
   determining displacements between said plurality of aliased ophthalmic images, and
   producing the image with an increased resolution in an overlapping area of said plurality of aliased ophthalmic images, based on said plurality of aliased ophthalmic images and said determined displacements, using a super-resolution algorithm.

2. The method of claim 1 wherein said imaging system acquires single aliased ophthalmic images, combining them into an image series by means of internal or external data memory.

3. The method of claim 1 wherein said imaging system combines the plurality of aliased ophthalmic images into an image series or video stream.

4. The method of claim 1 wherein said displacements between said plurality of aliased ophthalmic images are determined from said plurality of aliased ophthalmic images by minimizing a distance function of said plurality of aliased ophthalmic images.

5. The method of claim 2 wherein said displacements between said plurality of aliased ophthalmic images are determined from said plurality of aliased ophthalmic images by minimizing a distance function of said plurality of aliased ophthalmic images.

6. The method of claim 3 wherein said displacements between said plurality of aliased ophthalmic images are determined from said plurality of aliased ophthalmic images by minimizing a distance function of said plurality of aliased ophthalmic images.

7. The method of claim 1 wherein said displacements between said aliased ophthalmic images are determined by an external device such as an eye tracker.

8. The method of claim 2 wherein said displacements between said aliased ophthalmic images are determined by an external device such as an eye tracker.

9. The method of claim 3 wherein said displacements between said aliased ophthalmic images are determined by an external device such as an eye tracker.

10. The method of claim 1 wherein said non-integer pixel displacements are introduced by natural involuntary eye movements.

11. The method of claim 2 wherein said non-integer pixel displacements are introduced by natural involuntary eye movements.

12. The method of claim 3 wherein said non-integer pixel displacements are introduced by natural involuntary eye movements.

13. The method of claim 4 wherein said non-integer pixel displacements are introduced by natural involuntary eye movements.

14. The method of claim 5 wherein said non-integer pixel displacements are introduced by natural involuntary eye movements.

15. The method of claim 1 wherein said non-integer pixel displacements are introduced by inducing eye movements using a visual stimulus.

16. The method of claim 2 wherein said non-integer pixel displacements are introduced by inducing eye movements using a visual stimulus.

17. The method of claim 3 wherein said non-integer pixel displacements are introduced by inducing eye movements using a visual stimulus.

18. The method of claim 4 wherein said non-integer pixel displacements are introduced by inducing eye movements using a visual stimulus.

19. The method of claim 5 wherein said non-integer pixel displacements are introduced by inducing eye movements using a visual stimulus.

20. The method of claim 9 wherein the step of acquiring said plurality of aliased ophthalmic images is synchronized with a movement of said visual stimulus.

21. The method of claim 1, further comprising:
determining the displacements between the plurality of aliased ophthalmic images due to optical, geometrical or other distortions, and
correcting for these distortions.

22. The method of claim 1 further comprising:
dividing each of said aliased ophthalmic images into a number N smaller images,
grouping said smaller images together into N series of smaller images,
determining displacements between the smaller images for each of the N series of smaller images, and
producing an image with a an increased resolution, one image for each of the N series of smaller images.

23. The method of claim 1 further comprising:
dividing each of said aliased ophthalmic images into a number N smaller images,
grouping said smaller images together into N series of smaller images,
determining displacements between the smaller images for each of the N series of smaller images,
producing an image with a an increased resolution, one image for each of the N series of smaller images,
determining the displacements between the plurality of aliased ophthalmic images due to optical, geometrical or other distortions, and
correcting for these distortions.

24. The method of claim 1 further comprising:
dividing each of said aliased ophthalmic images into a number N smaller images,
grouping said smaller images together into N series of smaller images,
determining displacements between the smaller images for each of the N series of smaller images,
producing an image with a an increased resolution, one image for each of the N series of smaller images,
determining the displacements between the plurality of aliased ophthalmic images due to optical, geometrical or other distortions, and
correcting for these distortions and wherein the N images with an increased resolution are stitched together to produce one larger image.

25. An ophthalmic apparatus for producing an image with an increased resolution from a plurality of aliased ophthalmic images having an original resolution, the increased resolution being higher than the original resolution, the apparatus comprising:
an imaging system for acquiring said plurality of aliased ophthalmic images, thereby generating non-integer pixel displacements between said plurality of aliased ophthalmic images by using voluntary or involuntary eye movements, and
a processing unit for determining the displacements between said plurality of aliased ophthalmic images, and producing an image with an increased resolution in an overlapping area of said plurality of ophthalmic images, based on said plurality of aliased images and said displacements, using a super-resolution algorithm.

26. The ophthalmic apparatus according to claim 25 wherein the imaging system is further arranged to provide, in use, a visual stimulus during the acquisition of the plurality of aliased ophthalmic images.

27. The ophthalmic apparatus according to claim 25 wherein the imaging system is substantially stationary during the acquisition of the plurality of aliased ophthalmic images.

28. The ophthalmic apparatus according to claim 25 wherein the processing unit is arranged to, in use, synchronize the acquiring of said plurality of aliased ophthalmic images by the imaging system with a movement of said visual stimulus.

29. The ophthalmic apparatus according to claim 25 wherein the processing unit is arranged to, in use, synchronize the acquiring of said plurality of aliased ophthalmic images by the imaging system with a movement of said visual stimulus and wherein the imaging system is substantially stationary during the acquisition of the plurality of aliased ophthalmic images.

* * * * *

UNITED STATES PATENT AND TRADEMARK OFFICE
CERTIFICATE OF CORRECTION

PATENT NO. : 8,184,149 B2  
APPLICATION NO. : 12/666120  
DATED : May 22, 2012  
INVENTOR(S) : Michiel Herman Mensink et al.

Page 1 of 1

It is certified that error appears in the above-identified patent and that said Letters Patent is hereby corrected as shown below:

Column 9, line 22, replace "with a an increased resolution" with --with an increased resolution--.

Column 9, line 31, replace "with a an increased resolution" with --with an increased resolution--.

Column 9, line 44, replace "with a an increased resolution" with --with an increased resolution--.

Signed and Sealed this  
Eleventh Day of September, 2012

David J. Kappos  
*Director of the United States Patent and Trademark Office*